United States Patent Office 3,213,057
Patented Oct. 19, 1965

3,213,057
ORGANO-PHOSPHORUS COMPOUNDS
Paul E. Ritt, Fairfax, and Lee M. Kindley, Springfield, Va., assignors to Melpar, Inc., Falls Church, Va., a corporation of Delaware
No Drawing. Filed Dec. 6, 1960, Ser. No. 73,959
1 Claim. (Cl. 260—47)

INTRODUCTION

This invention generally relates to the preparation of new organo-phosphorus compounds. More particularly this invention, according to one embodiment, relates to the preparation of fire retardant and thermally stable plastic materials by incorporating phosphorus atoms into organic molecules having two or more epoxide groups. In another embodiment, this invention also relates to the preparation of certain novel phosphine oxides.

BACKGROUND

Numerous methods of achieving greater thermal stability and/or fire retardance in plastic materials have been suggested. This is done by varying the structure of a pure organic material, addition of inorganic "fillers," incorporation of metallic or metalloid atoms in the molecule, incorporation of halogen atoms in the molecule, etc.

Phosphorus has been incorporated in esters used as flame retardant plasticizers. It has also been used in vinyl type polymers and in epoxides containing only one epoxide group.

Prior to the present invention, polymers containing phosphorus were characterized by one or more of the following disadvantages: (1) water solubility; (2) instability towards hydrolysis. Phosphorus compounds containing one epoxide group behave as reactive diluents in epoxide resin formulations rather than as a two or three dimensional polymer.

OBJECTS

It is therefore a primary object of this invention to prepare new organo-phosphorus compounds. Another object of this invention is to prepare novel and useful fire retardant and thermally stable plastic materials by incorporating phosphorus atoms into organic molecules having two or more epoxide groups. A further object is to prepare new phosphine oxides. These and other objects will appear in the following description and claim.

THE NOVEL PRODUCTS OF THE INVENTION

The novel products of primary commercial importance in accordance with this invention can be characterized by the formula:

$$CH_2\underset{O}{\overset{}{\diagdown\diagup}}CHCH_2[OR_1CH_2\overset{O}{\underset{R}{\overset{\|}{P}}}CH_2R_1OCH_2\overset{OH}{\underset{|}{C}}HCH_2]_n-OR_2CH_2\overset{O}{\underset{R}{\overset{\|}{P}}}CH_2R_1OCH_2CH\underset{O}{\overset{}{\diagdown\diagup}}CH_2$$

wherein:
$R_1$ represents the group

—⟨○⟩—

$n$ represents either 0 (for a pure compound) or an integer between 1 and 4 (for the polymer); and R broadly represents an alkyl or aryl group, the alkyl group preferably having 1–8 carbon atoms and most preferable is a methyl, ethyl, propyl or butyl group—and the aryl group is preferably phenyl.

PREPARATION OF THE NOVEL PRODUCTS

It is possible to produce the novel products of this invention in a number of ways. One of the preferred methods involves three steps, as follows:

(1) Reaction of a phosphonyl chloride having the formula $$R-\underset{O}{\overset{\|}{P}}-Cl_2$$

with a Grignard reagent having the formula $$Cl-R_1-CH_2MgCl$$

to produce a chlorine substituted tertiary phosphine oxide having the formula $$R-\underset{O}{\overset{\|}{P}}-(CH_2-R_1-Cl)_2$$

and magnesium chloride, wherein the above formulas R broadly represents an alkyl or aryl group, the alkyl group preferably having 1–8 carbon atoms and most preferably is a methyl, ethyl, propyl or butyl group—and the aryl group is preferably phenyl, and $R_1$ represents the group

—⟨○⟩—

(2) Hydrolysis of the said chlorine substituted tertiary phosphine oxide to yield the corresponding phenolic tertiary phosphine oxide as follows:

$$(Cl-R_1-CH_2)_2-\underset{O}{\overset{\|}{P}}-R \xrightarrow[\substack{Cu_2O \\ 225°\,C. \\ Acidification}]{\text{Aqueous NaOH}} (HO-R_1-CH_2)_2-\underset{O}{\overset{\|}{P}}-R$$

The hydrolysis is a closed system reaction carried out in a bomb (see Examples I–IV).

(3) Reaction of said phenolic tertiary phosphine oxide with epichlorohydrin to yield a diepoxide or an epoxide resin having terminal epoxide groups, as follows:

$$CH_2\underset{O}{\overset{}{\diagdown\diagup}}CHCH_2Cl + (HO-R_1-CH_2)_2\underset{O}{\overset{\|}{P}}-R \xrightarrow[\text{NaOH}]{30\% \text{ aqueous}}$$

$$CH_2\underset{O}{\overset{}{\diagdown\diagup}}CHCH_2[OR_1CH_2\overset{O}{\underset{R}{\overset{\|}{P}}}CH_2R_1OCH_2\overset{OH}{\underset{|}{C}}HCH_2]_n-OR_1CH_2\overset{O}{\underset{R}{\overset{\|}{P}}}CH_2R_1OCH_2CH\underset{O}{\overset{}{\diagdown\diagup}}CH_2$$

wherein $n$ represents either 0 or an integer between 1 and 4, depending upon the molar ratios of epichlorohydrin, phenolic tertiary phosphine oxide and sodium hydroxide (see Example III).

Alternative processes will readily suggest themselves to those skilled in the art. For example, in preparing the chlorine substituted tertiary phosphine oxide, phosphorus oxychloride, $POCl_3$ may be used instead of the phosphonyl dichloride, $$R-\underset{O}{\overset{\|}{P}}-Cl_2$$

set forth in step 1. The chlorine subsituted tertiary phosphine oxide obtained by this alternate procedure would have the formula

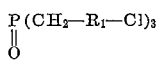

and can be hydrolyzed to a phenolic tertiary phosphine oxide having the formula

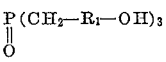

which can then be reacted with epichlorohydrin in the manner described relative to aforementioned steps 2 and 3.

Another modification of the above process would involve the phosphonyl chloride

wherein R and $R_2$ may be the same or different alkyl or aryl groups, instead of the phosphonyl dichloride

set forth in step (1) above. In such a case the chloride substituted tertiary phosphine oxide would have the formula

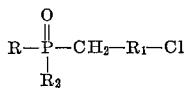

The product resulting from the hydrolysis of the chlorine substituted tertiary phosphine oxide as set forth in step (2) would be the phenolic tertiary phosphine oxide having the formula

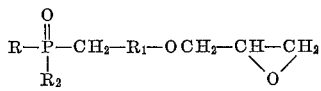

EXAMPLES

The following examples are illustrative of preferred embodiments of the present invention. It should be understood that these examples are not intended to limit the invention and that obvious changes may be made by those skilled in the art without changing the essential characteristics and the basic concept of the invention. The parts and percentages are by weight, the temperature is room temperature and the pressure is atmospheric, unless otherwise indicated.

*Example I*

PREPARATION OF BIS(p-CHLOROBENZYL)METHYL-PHOSPHINE OXIDE

A Grignard reagent was prepared in the usual manner from p-chlorobenzyl chloride, 53.5 g. (0.33 mole), and magnesimum, 8 g. (0.33 gram atom) in ethyl ether. Methyl phosphonyl dichloride, 10.9 g. (0.082 mole), in benzene was added to the cooled well-stirred Grignard reagent. After the addition was complete, the reaction mixture was gently refluxed for 2 hours, then allowed to stir at room temperature overnight. The mixture was cooled and hydrolyzed by adding dropwise a cold solution of 50 g. $NH_4Cl$ in 250 ml. water. The layers were separated, and the water layer was washed three times with 50 ml. portions of benzene. The organic layer and washings were combined, and approximately 15 ml. of 10 percent alcoholic KOH was added to precipitate any magnesium which might be present as a complex and to combine with any phosphonic acids which may have formed. A small amount of material precipitated upon addition of the alcoholic KOH and this was removed by filtration. The reaction mixture was then distilled at atmospheric pressure to remove solvent. The pressure was reduced to 10 mm. and 8.1 g. of p-chlorotoluene distilled over at 50° C. The pressure was further reduced to 0.1 to 0.3 mm. and a mixture of bis(p-chlorobenzyl) methylphosphine oxide and the coupling compound, 4,4'-dichlorobibenzyl distilled over a range of 110° to 235° C. and solidified immediately in the receiver. The solid distillate was recrystallized from benzene to yield 9.5 g. (37.0% of the theoretical) of white crystals. M.P. 145–7° C.

*Analysis.*—Calculated for $C_{15}H_{15}OPCl$: C, 57.5%; H, 4.8%; P, 9.9%; Cl, 22.7%. Found: C, 57.9%; H, 5.4%; P, 9.2%; Cl, 22.7%.

*Example II*

PREPARATION OF BIS(p-HYDROXYBENZYL)METHYL-PHOSPHINE OXIDE

Sodium hydroxide, 4.8 g. (0.12 mole), in 60 ml. water and $Cu_2O$, 1.8 g., were mixed with bis(p-chlorobenzyl) methylphosphine oxide, 9.3 g. (0.03 mole), and introduced into a rocker-type bomb. The reaction mixture was agitated (by rocking) for 16 hours at 225° C. (temperature inside bomb). After cooling the reaction mixture was filtered to remove $Cu_2O$ catalyst and unreacted starting material. The filtrate was extracted with two 50 ml. portions of ether. A sample of the water layer was analyzed for Cl⁻ ion. The analysis indicated that the hydrolysis was 62.8% complete. Carbon dioxide was bubbled through the water layer until the pH was about 8. The solid, white material which precipitated was filtered, washed with water and dried. Yield 1.25 g. (15.1% of theoretical). M.P. 260–3° C.

*Analysis.*—Calculated for $C_{15}H_{17}O_3P$: C, 65.3%; H, 6.17%; P, 11.2%. Found: C, 64.5%; H, 5.82%; P, 11.1%.

*Example III*

PREPARATION OF p-CHLOROBENZYLDIMETHYL-PHOSPHINE OXIDE

The compound was prepared by a Grignard reaction as follows:

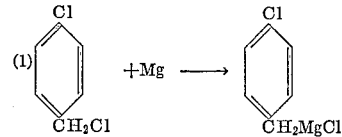

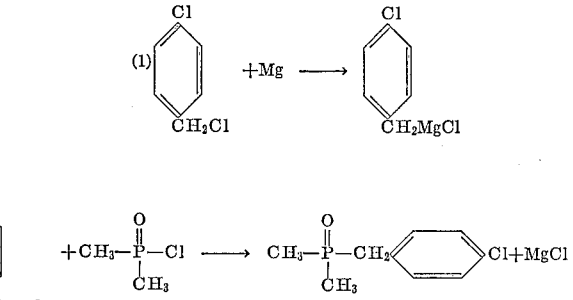

The Grignard reagent was prepared in the usual manner from p-chlorobenzyl chloride, 16.1 g. (0.1 mole), and magnesium, 2.4 g. (0.1 mole), in ethyl ether. Dimethyl phosphonyl chloride, 5 g. (0.44 mole) in benzene was added to the cooled, well-stirred Grignard reagent. After the addition was complete, the reaction mixture was gently refluxed for 2 hours, then allowed to stir at room tempearture overnight. The mixture was cooled and hydrolyzed by adding dropwise a cold solution of 20 g. $NH_4Cl$ in 100 ml. water. The layers were separated and the water layer washed three times with 50 ml. portions of benzene. The organic layer and washings were combined and distilled at atmospheric pressure to remove solvent. The pressure was reduced to 0.06 to 0.2 mm. and a mixture of p-chlorobibenzyl distilled over a range of 120°–142° C. and solidified immediately in the receiver. The solid distillate was recrystallized twice from benzene. A small amount of white crystals was obtained, M.P. 130–2° C., which was ascertained to be p-chlorobenzyldimethylphosphine oxide.

*Analysis.*—Calculated for $C_9H_{12}OPCl$: C, 53.3%; H, 5.9%. Found: C, 54.0%; H, 5.7%.

*Example IV*

PREPARATION OF TRIS(p-CHLOROBENZYL) PHOSPHINE OXIDE

The compound was prepared by a Grignard reaction as follows:

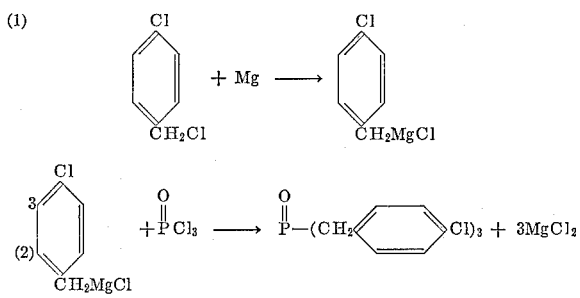

The Grignard reagent was prepared in the usual manner from p-chlorobenzyl chloride, 80.5 g. (0.5 mole), and magnesium, 12 g. (0.5 gram atom), in ethyl ether. Phosphorus oxychloride, 19.2 g. (0.125 mole), was added to the cooled well-stirred Grignard reagent. After the addition was complete, the reaction mixture was gently refluxed for 1½ hours. The mixture was then cooled and hydrolyzed by adding dropwise a cold solution of 50 g. $NH_4Cl$ in 250 ml. water. The layers were separated and the water layer washed three times with 50 ml. portions of ether. The combined ether layer and washings were distilled to remove the ether. The residue were crystallized from a mixture of benzene and petroleum ether. The yellow crystals, contaminated by a viscous liquid, were recrystallized three more times from a benzene-petroleum ether mixture. A trace of white crystals was recovered, M.P. 179–180° C.

*Analysis.*—Calculated for $C_{21}H_{18}OPCl_3$: C, 59.5%; H, 4.2%; P, 7.3%; Cl, 25.2%. Found: C, 59.5%; H, 4.6%; P, 7.2%; Cl, 25.2%.

*Example V*

PREPARATION OF TRIS(p-CHLOROBENZYL) PHOSPHINE OXIDE

By a slight modification of the procedure in Example IV a somewhat better yield was obtained. The Grignard reagent was prepared in the usual manner from p-chlorobenzyl chloride, 161 g. (1.0 mole), and magnesium, 24 g. (1.0 gram atom), in ethyl ether. Phosphorus oxychloride, 38.4 g. (0.25 mole), in benzene was added to the cooled well-stirred Grignard reagent. After the addition was complete, the reaction mixture was stirred for 1½ hours maintaining the temperature at 10–20° C. during this period. The mixture was then hydrolyzed by adding dropwise a cold solution of 100 g. $NH_4Cl$ in 500 ml. water. The layers were separated and the water layer washed three times with 50 ml. portions of ether. The combined ether layer and washings were distilled to remove solvent, and the very viscous liquid which remained was crystallized from benzene. The yellow crystals were recrystallized from benzene and washed with a little cold ether to obtain 13.0 g. (12.2% of the theoretical) of white crystals.

*Example VI*

PREPARATION OF ORGANO-PHOSPHORUS EPOXIDE COMPOSITION

Bis(p-hydroxybenzyl)methylphosphine oxide 2.76 g., (0.01 mole) was dissolved in 3.68 g. (0.04 mole) epichlorohydrin and heated to 100° C. Sodium hydroxide (0.4 mole of a 30% aqueous solution) was added dropwise maintaining the pH below 9. A resinous phosphorus epoxide composition separated out.

ADVANTAGES AND UTILITY OF INVENTION

The novel compositions of this invention are fire retardant, have high temperature stability and possess the attractive mechanical and chemical resistant features of conventional epoxide compositions. These novel compositions form useful plastic, adhesive and coating materials. The compositions of this invention are also less susceptible to hydrolysis since they contain no

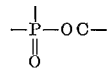

or ester type linkages.

What is claimed is:

The condensation product of a molal excess of epichlorhydrin with bis(p-hydroxy benzyl) methyl phosphine oxide.

References Cited by the Examiner

UNITED STATES PATENTS

| | | | |
|---|---|---|---|
| 2,160,840 | 6/39 | Dreyfus | 260—606.5 |
| 2,646,420 | 7/53 | Morgan | 260—606.5 |
| 2,839,494 | 6/58 | Reese | 260—47 |
| 2,913,498 | 11/59 | Ramsden | 260—606.5 |
| 2,947,725 | 8/60 | Cooke | 260—47 |
| 2,969,398 | 1/61 | Buckler | 260—606.5 |

OTHER REFERENCES

Chem. and Eng. News, vol. 38, page 36, Feb. 1, 1960.
Senear et al.: "Jour. Organic Chem.," vol. 25, November 1960, pp. 2001–6.

MURRAY TILLMAN, *Primary Examiner.*

IRVING MARCUS, JOSEPH R. LIEBERMAN,
*Examiners.*